April 27, 1926.
A. E. BRONSON
1,582,630
VALVE INSIDES
Filed July 25, 1921
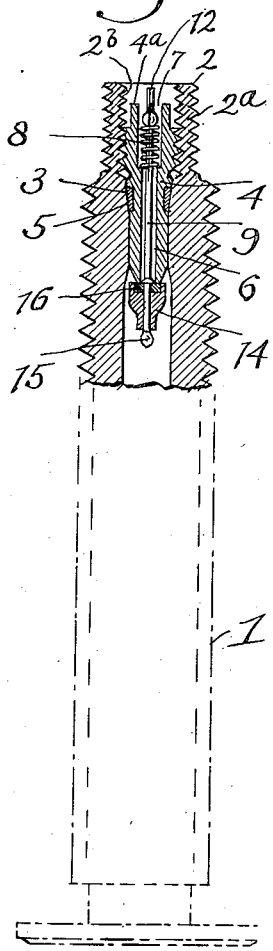
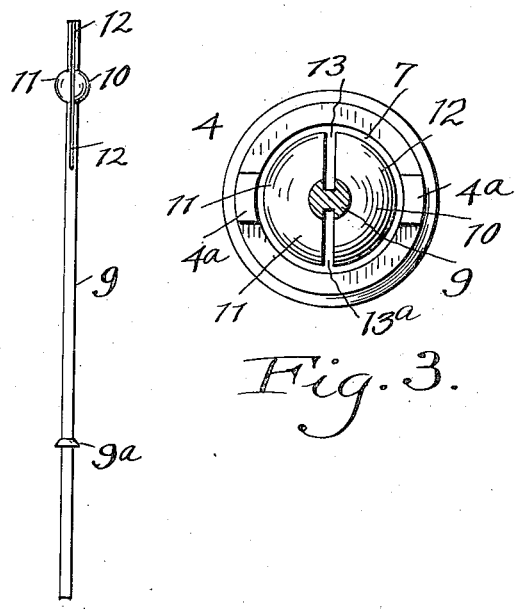
Inventor
Adelbert E. Bronson
by
Thurston King & Hudson
attys Patented Apr. 27, 1926.

1,582,630

UNITED STATES PATENT OFFICE.

ADELBERT E. BRONSON, OF CLEVELAND, OHIO, ASSIGNOR TO THE DILL MANUFACTURING COMPANY, OF CLEVELAND, OHIO, A CORPORATION OF OHIO.

VALVE INSIDES.

Application filed July 25, 1921. Serial No. 487,446.

*To all whom it may concern:*

Be it known that I, ADELBERT E. BRONSON, a citizen of the United States, residing at Cleveland, in the county of Cuyahoga and State of Ohio, have invented a certain new and useful Improvement in Valve Insides, of which the following is a full, clear, and exact description.

The present invention relates to a valve insides, which are adapted to be inserted in a valve stem for use in connection with pneumatic tires or the like.

Reference should be had to the accompanying drawings forming a part of the specification, in which Fig. 1 is an elevation with portions in section showing the valve casing with a valve insides inserted therein; Fig. 2 is an elevation of a valve stem for the valve insides; Fig. 3 is a top plan view very much enlarged of the stem insides.

Referring to the drawings, 1 indicates the usual so-called valve stem which is threaded upon the exterior surface and is hollow. This valve stem is adapted for use with an inner tube of a tire or any other rubber container which is to be inflated by air.

The outer end of the valve stem has an extension of reduced diameter such as indicated at 2, which is threaded upon the exterior, as indicated at 2ª, for the reception of a valve cap, and is also threaded upon the interior, as indicated at 2ᵇ for the reception of a valve insides. The inner core of the valve stem is at a portion thereof slightly reduced in diameter, as indicated at 3, and at this portion forms a seat against which a part of the valve insides engages to form an air tight joint.

The valve insides comprise a body portion 4 which at the upper part thereof is exteriorly threaded to engage with the threads 2ᵇ.

At a portion below the threaded part there is a packing member, such as indicated at 5 which is adapted to be compressed against the sides of the wall of the bore of the valve stem for the purpose of making a tight joint.

The body portion is provided with a central opening or bore indicated at 6, and this bore at the upper part thereof is enlarged as indicated at 7. This enlarged portion will at the lower end form an offset or shoulder and against this will rest the lower end of a spring 8. At the upper end of the body portion 4 are extensions such as indicated at 4ª, which serve as screw driver provisions and are engageable by the serrated end of a usual valve cap in a manner which is perfectly well known.

Extending through the bore of the body portion is a valve stem 9, and this valve stem also extends centrally through the spring 8 to which reference has before been made. The valve stem 9 adjacent its outer end is provided with oppositely disposed spaced extensions 10 and 11. These extensions being spaced as stated will permit air to pass through the space between the extensions. In the present instance the extensions 10 and 11 are formed by upsetting a portion of the valve stem so as to provide substantially a sphere construction against the under side of which the end of the spring 8 may engage. This spherical construction is of a diameter which is but little less than the diameter of the enlarged bore 7. This is purposeful in that it provides a guide for the valve stem because as the valve stem moves the spherical projection on the valve stem will contact with the wall portion and will tend to center the valve stem. This is particularly important when the tire is gauged, or when it is inverted, as the mechanical application of force to the valve stem may very readily cause damage to the valve stem or to the seat at the lower end of the valve stem, unless the movement of the valve stem be guided so as to be central of the bore in which it operates.

The valve stem and the spherical extension are provided with oppositely disposed grooves 13 and 13ª, these grooves extending part way into the valve stem itself, and through opposite portions of the spherical extension 12, thereby dividing it substantially into two parts.

The grooves which have been described will readily permit the passage of air around the spherical projection, even though it be of a diameter almost as great as the diameter of the bore 7.

The valve stem is also provided with an extension 9ª adjacent the lower portion against which there may abut a valve proper which is indicated at 14, this valve being held on the valve stem by crimping a portion of the valve stem as indicated at 15. The valve proper 14 is provided with a washer 16 which is adapted to engage with the lower end of the valve body.

When the device is assembled as indicated in the drawings, the valve proper 14 is normally maintained against the lower end of the valve casing by the resiliency of the spring 8, and as before stated, the valve stem proper is guided as it may move by the spherical projection or the half spherical projections 10 and 11, which permit only a limited amount of side play of the valve stem proper, and therefore no injury can be effected.

It should be remembered that these valve insides are very small, and that the vertical stem proper for the valve insides is a piece of wire which is of small diameter, and hence is likely to injury.

By providing the projections 10 and 11 as recited there is secured not only a guiding action between the sides of the valve body and the valve stem, but also there is secured an effective seat against which the upper end of the spring may engage.

This construction is much cheaper than where a separate washer is inserted over the end of the valve stem for the purpose of forming a seat for the end of the spring.

Having described my invention, I claim,

1. In a valve insides, a body portion, a bore extending axially through said body portion said bore being of enlarged diameter at its upper end, a spring in said enlarged bore, a valve stem extending through the bore and through the spring, a valve proper carried by the valve stem and engaging with the lower end of the valve casing, said valve stem being provided with a pair of spaced extensions which extensions are of but slightly less diameter than the diameter of the bore in which they are placed thereby forming guides for the valve stem, said extension also serving as a seat against which one end of the aforesaid spring may bear.

2. In a valve insides, a body portion, a bore extending axially through said body portion, said bore being of enlarged diameter at its upper end, a spring in said enlarged bore, a valve stem extending through the bore and through the spring, a valve proper carried by the valve stem and engaging with the lower end of the valve casing, said valve stem at a part thereof above the spring being provided with a pair of spaced hemispherical projections which are of slightly less diameter than the diameter of the bore in which they are placed thereby forming a guiding means for the valve stem, and also serving as a seat against which one end of the aforesaid spring may bear.

3. In a valve insides, a body portion, a bore extending axially through said body portion, said bore being of enlarged diameter at its upper end, a spring in said enlarged bore, a valve stem extending through the bore and through the spring, a valve proper carried by the valve stem and engaging with the lower end of the valve casing, said valve stem being provided with a body which extends from the valve stem said body being provided with grooves or spaces through which air may pass, the diameter of said extension being slightly less than the diameter of the bore in which it is placed thereby forming a guide for the valve stem and said extension also serving as a seat against which one end of the aforesaid spring may bear.

In testimony whereof, I hereunto affix my signature.

ADELBERT E. BRONSON.